June 3, 1924.
J. G. MELIUS
WATER GAUGE PROTECTOR
Filed Feb. 26, 1923
1,496,481
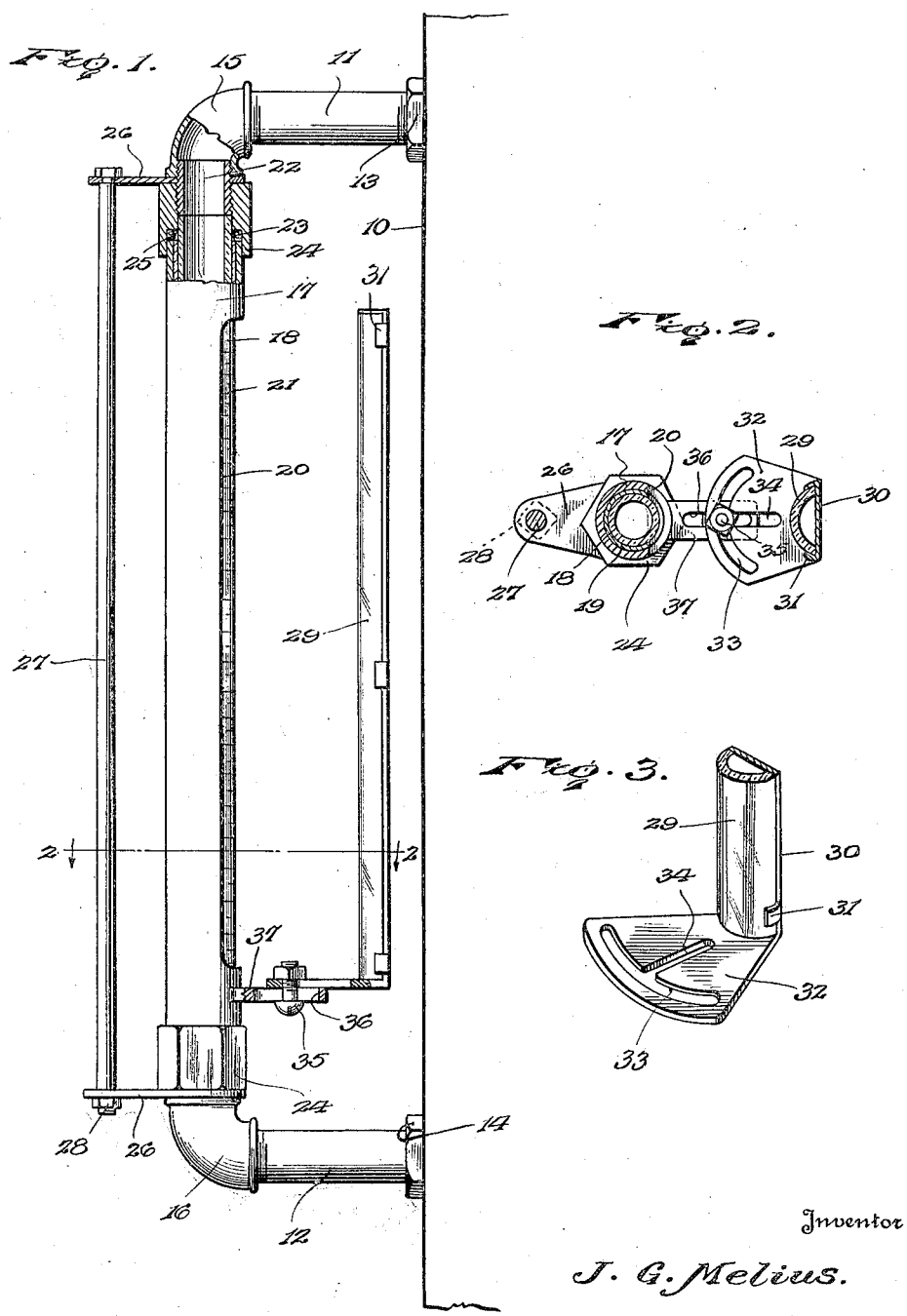
Inventor
J. G. Melius.
By Lacey Lacey, Attorneys Patented June 3, 1924.

1,496,481

UNITED STATES PATENT OFFICE.

JAMES G. MELIUS, OF PHILOMATH, OREGON.

WATER-GAUGE PROTECTOR.

Application filed February 26, 1923. Serial No. 621,374.

*To all whom it may concern:*

Be it known that I, JAMES G. MELIUS, a citizen of the United States, residing at Philomath, in the county of Benton and State of Oregon, have invented certain new and useful Improvements in Water-Gauge Protectors, of which the following is a specification.

My invention relates to water gauges and the object of the invention is to provide a gauge which protects the observer from flying splinters of glass in case the glass tube should break.

Another object of the invention is to furnish an auxiliary reading scale or reflector which is adjustable with regard to the water glass and may be turned and set into the position that is most convenient for the observer to read the height of the water.

In the accompanying drawing one embodiment of the invention is illustrated, and;

Figure 1 shows a side elevation of the device erected on a boiler or tank;

Figure 2 is a horizontal section along line 2—2 of Figure 1; and

Figure 3 is a fragmentary perspective view of one of the details.

In the drawings reference numeral 10 represents the side of a boiler or tank upon which the gauge is secured for reading the height of the water or other liquid contained therein. Two short pieces of pipe 11 and 12 are attached to the side of the boiler or tank 10 in the usual manner and held securely thereon by nuts 13 and 14 respectively. These two pipes are situated near the top and bottom of the boiler or tank 10 and in the same vertical plane, one above and the other below the normal water level. Reference numerals 15 and 16 show elbows threaded on the outer ends of the short pipes 11 and 12 and between the opposing ends of the elbows is secured a metal tube or casing 17. Within the casing 17 is supported the glass tube 18 preferably supplied with an asbestos packing 19 completely surrounding the same with the exception of the opening 20 extending in the longitudinal direction of the casing 17 for exposing the graduating portion 21 of the glass tube 18.

In the opposing ends of the elbows 15 and 16 are threaded short nipples 22 of substantially the same outer diameter as the glass tube 18. These nipples 22 are of such a length that they project beyond the ends of the elbows 15 and 16 and abut against the respective ends of the glass tube 18. In order to form tight joints at these points, nuts 24 are threaded on the nipples and each provided with a recessed portion 25 at the opposing ends, adapted to receive washers 23 and the outer ends of the casing 17. Between each nut 24 and the adjacent end of its elbow 15 or 16 is inserted a plate bracket 26, against which the nut is drawn up tightly and a connecting rod 27 engages the outer ends of these brackets 26 and a nut 28 is threaded on the end of the connecting rod 27 in order to draw the brackets together and in this manner securely hold the glass tube and its guard or casing 17 in position between the nuts 24.

As clearly shown in Figure 1, the longitudinal slot or opening 20 is facing the side of the boiler or tank 10 and the solid portion of the metal tube 17 is turned away therefrom, so as to completely protect a person standing facing the boiler from flying glass of a broken tube 18. It is evident that with a person positioned in this manner it would be impossible for him to read the graduation 21 on the tube and for this reason a mirror 29 is furnished and placed in such a position that it faces the open side of the casing 17, so that the graduation 21 may be reflected by the mirror to the observer standing on the opposite side of the gauge. This mirror is preferably made in the form of a hollow cylinder cut in two longitudinally and mounted to present its convex outer surface in the direction of the graduation 21 of the glass tube. This mirror may be made of glass, or more substantial material may also be selected such as a highly polished, nickel plated, metal pipe which is held in position by a frame 30 placed parallel with the axis of the water tube 18 and having a plurality of ears or lugs 31 engaging the rearwardly turned edges of the mirror 29. The lower end of the frame 30 is a sector-shaped foot 32 with an arcuate slot 33 having a radial branch 34. A securing bolt 35 engages in this slot and also in a corresponding slot 36 in a short arm 37, which is rigidly secured on the lower end of the casing 17. By means of this arrangement it is possible to not only advance or retract the mirror 29 with regard to the water tube 18, but also to turn it sideways so that the reading in the mirror of the scale 21 can be made on the right or left of the gauge as found most suitable for conditions at hand.

This gauge is well protected from any injury from exterior sources as its open face is turned toward the boiler and its solid back turned away therefrom. It also furnishes protection to the observer in case of bursting of the glass tube 18, so that this practically means that no flying pieces of glass could hit him. At the same time the water level in the boiler or tank can be readily ascertained at any moment by observing its height on the scale 21 as reflected in the mirror 29.

It will be evident that on boilers using straight connections with stop cocks, the pipes 11 and 12, and elbows 15 and 16 are dispensed with and the gauge with the protector attached directly to such connections instead.

Having thus described the invention what is claimed as new is:

1. A water gauge comprising a graduated glass tube, a casing having an open face on one side fitting closely around the glass tube, means for securely connecting the open ends of the glass tube to a pair of pipes opening into a tank, a mirror adapted to reflect said graduation, a frame for said mirror, a foot on said frame and integral therewith, an arm integral with said casing, and means for adjustably clamping said foot on said arm in radial as well as angular direction in relation to said glass tube.

2. A water gauge comprising a graduated glass tube, a casing having an open face on one side fitting closely around the glass tube, means for securely connecting the open ends of the glass tube to a pair of pipes opening into a tank, a mirror adjustably secured on said casing adapted to reflect said graduation, a frame for said mirror, a foot on said frame, an arm on said casing, and means for clamping said foot on said arm, said clamping means consisting of a bolt engaging a radial slot in said arm and in arcuate and radial slots provided in said foot.

3. A water gauge comprising a graduated glass tube, a casing having an open face on one side fitting closely around the glass tube, means for securely connecting the open ends of the glass tube to a pair of pipes opening into a tank, a mirror adapted to reflect said graduation, a frame for said mirror, a foot integral with said frame provided with arcuate and radial slots, an arm integral with said casing having a radial slot, a clamping element adapted to engage in said slots of said foot and said arm for adjustably securing the mirror in relation to said glass tube, said connecting means including a recessed nut engaging each end of said glass tube and the casing, brackets associated with said nuts, and a connecting rod between said brackets for drawing said nuts together.

In testimony whereof I affix my signature.

JAMES G. MELIUS. [L. S.]